United States Patent [19]

Gosse et al.

[11] Patent Number: 4,600,174

[45] Date of Patent: Jul. 15, 1986

[54] DUCT MOUNTING FIXTURE FOR SECURING A DUCT ON A SUPPORT

[75] Inventors: Marc Gosse; Jacques Chéron, both of Cleres, France

[73] Assignee: Legrand, Limoges, France

[21] Appl. No.: 565,763

[22] Filed: Dec. 27, 1983

[30] Foreign Application Priority Data

Sep. 16, 1983 [FR] France ................. 83 14758

[51] Int. Cl.⁴ ............................................. A44B 21/00
[52] U.S. Cl. ........................................ 248/72; 248/73
[58] Field of Search ............. 248/72, 49, 228, 73; 403/400, 387, 389, 397; 24/573, 458, 457, 590, 591, 453, 297

[56] References Cited

U.S. PATENT DOCUMENTS

| | | | |
|---|---|---|---|
| 2,656,578 | 10/1953 | Tworek | 24/453 |
| 3,177,540 | 4/1965 | Hall | 24/453 |
| 3,210,032 | 10/1965 | Van Slyke | 248/73 |
| 3,213,500 | 10/1965 | Thompson | 403/397 |
| 3,298,071 | 1/1967 | Flora | 24/590 |
| 3,417,438 | 12/1968 | Schuplin | 248/73 |
| 3,568,263 | 3/1971 | Meehan | 24/458 |
| 3,811,154 | 5/1974 | Lindeman | 24/458 |
| 3,921,261 | 11/1975 | Fisher | 24/591 |
| 4,131,258 | 12/1978 | Okuda | 248/73 |
| 4,247,219 | 1/1981 | Ausprung | 24/453 |
| 4,402,117 | 9/1983 | Kitagawa | 24/590 |

FOREIGN PATENT DOCUMENTS 2429349 2/1980 France ................. 248/228
611760 10/1960 Italy ................. 24/590

Primary Examiner—Reinaldo P. Machado
Assistant Examiner—Alvin Chin-Shue
Attorney, Agent, or Firm—Charles E. Brown; Charles A. Brown

[57] ABSTRACT

A duct mounting fixture for securing a duct to a generally channel-shaped support section having right angle flanges at distal ends of legs or sidewalls is disclosed. The mounting fixture includes a base plate having an outer surface defining a bearing surface for an endwall of a duct, an aperture for a latch member in a middle zone of the outer surface of the base plate, the latch member extending through an opening in the endwall of the duct and grip the endwall. Two pairs of retaining teeth are disposed on the underside of said base plate and selectively cooperable with right angle flanges on different omega- and G-shaped supports. The pairs of retaining teeth are perpendicular to each other and arranged in a generally rectangular array. Thin deformable webs on the retaining teeth restrain the fixture against inadvertent sliding movement on the support section, and thin deformable webs between the head and shank of the latch member compensate for the thickness of the duct endwall.

15 Claims, 11 Drawing Figures

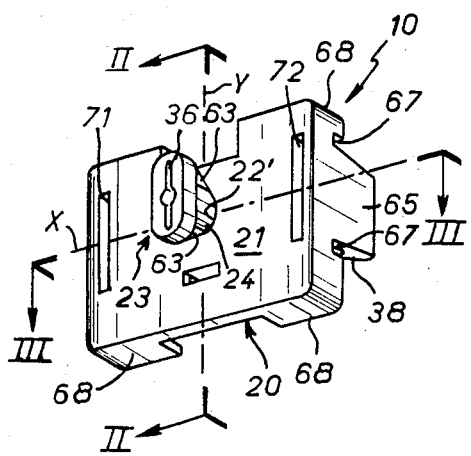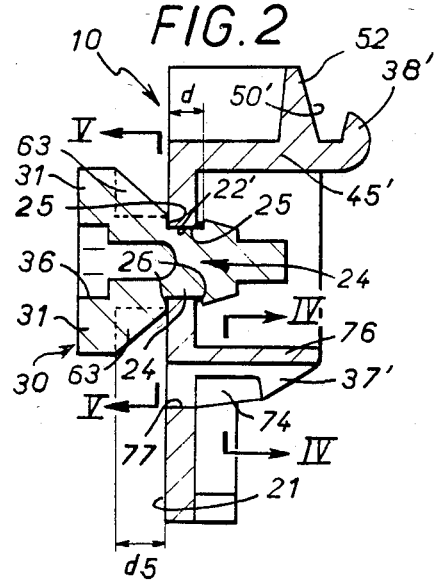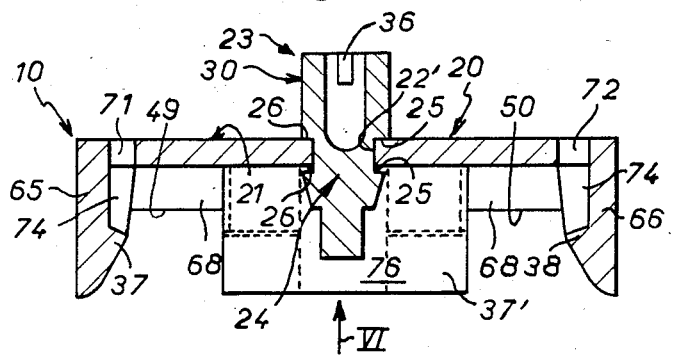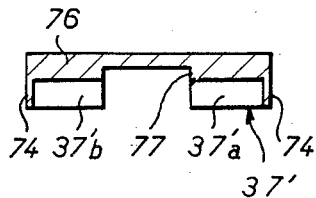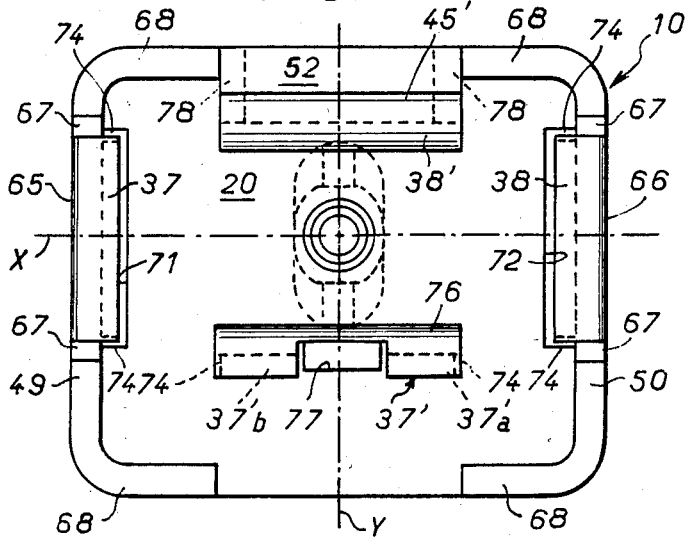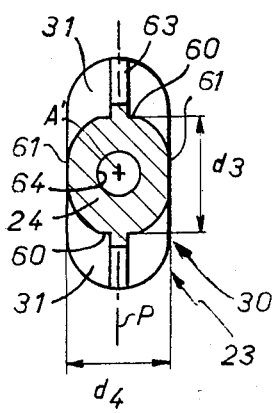

DUCT MOUNTING FIXTURE FOR SECURING A DUCT ON A SUPPORT

BACKGROUND OF THE INVENTION

The present invention relates generally to ducts of the type currently employed for guiding electric conductors in switch or control boxes, that is, boxes or cabinets for accommodating switchgear and control gear.

Such ducts which are for example made of plastic typically have a U-shaped cross section and along the center line of their endwall uniformly spaced-apart openings for receiving fastening members necessary for securement to some sort of support member. These openings are usually longitudinally elongate slots for enabling the adjustment of the position of the duct relative to the support member on which it is to be mounted.

The present invention relates more particularly to the securement of such a duct on a support member which is previously installed in the switch or control box. Conventionally such a support member comprises a perforate plate generally made of metal. It therefore follows that in order to install the duct a control box must usually be equipped with such a perforate plate.

In addition to control boxes fitted with such perforate plates there are control boxes equipped with a frame comprising an array of support sections, generally made of metal, and of U-shaped cross section the legs or sidewalls having right angle bends or flanges for snapping on the desired switchgear or control gear.

According to standardized arrangements the legs may be of different heights and their right angle flanges are usually outwardly directed, away from each other and at the same level. As a variant such legs may be at different heights with respect to each other, and their right angle flanges are then usually inwardly directed toward each other, but at different levels.

In any event heretofore such ducts could not be easily mounted on such structural sections.

Moreover, the securement of ducts to a perforate plate has usually required the use of screws or even rivets. Such a fastening member must be picked out of a loose batch of such fastening members which is time-consuming and a source of losses of such fastening members.

When fastening members are threaded fasteners or screws, whether of metal or plastic, after passing through the endwall of a duct, the perforate plate must receive a nut from the remote side of the perforate plate. Since this requires the electrician or installer to work from the rear of the perforate plate it is in practice inconvenient and relatively time-consuming.

Further, as regards metal threaded fasteners, their use is contrary to safety regulations since they form a conductive path between the electric conductors in the duct and the subjacent perforate plate, to the detriment of normal unbroken insulation of the endwall of the duct.

As for the use of rivets, they require special tools whether they are made of metal or plastic.

In a copending application Ser. No. 565,764 filed on even date with the instant application, and assigned to assignee of the present application, there is disclosed a novel duct mounting fixture for the securement of a duct on a support section having sidewalls with right angle flanges. The duct mounting fixture comprises a base plate having an outer side which defines a bearing plane against which the endwall of the duct is adapted to bear. Means in the middle zone of the outer side of the base plate is adapted to receive a fastening member which is adapted to extend through the endwall of the duct via an opening therein and grip the endwall. At least two retaining teeth disposed on the underside of the base plate are adapted to cooperate with the right angle flanges of a support section, and at least one of the retaining teeth is carried by a resilient arm which is deformable in the course of engagement.

In practice, for such a duct mounting fixture to be used on either of two different types of support sections two pairs of separate retaining teeth are provided, each pair for one type of support section. The fastening member provided on the outer side of the base plate for gripping the endwall of the duct is in practice a rotatable latch member which turns 90° after its head is extended through the endwall of the duct.

SUMMARY OF THE INVENTION

According to a first feature of the present invention the two pairs of retaining teeth provided for two different types of support sections are oriented in different directions on the base plate. In practice, the pairs of retaining teeth are arranged orthogonally or crosswise to each other. The two retaining teeth of a first pair of retaining teeth are disposed on opposite sides of the fastening member transversely with respect to a first direction of the base plate while the two retaining teeth of the second pair of retaining teeth extend transversely with respect to a second direction of the base plate which is perpendicular to the first direction.

Compared with the aligned arrangement of the retaining teeth disclosed in the abovementioned copending patent Ser. No. 565,764 the orthogonal arrangement advantageously permits a more compact duct mounting fixture structure. This produces a substantial savings of material as well as enhanced ease of molding the duct mounting fixture. Indeed the mold therefor is simplified and comprises a smaller number of sliders or cores. This results in an overall reduction of manufacturing costs.

The present arrangement has the additional advantage of eliminating any risk of interference between the particular support section and the retaining teeth which are unused when the mounting fixture is secured to such a support section.

According to another feature of the present invention at least one of the retaining teeth is transversely divided by at least one thin, deformable web. Such a web is, for example, provided at least one of the ends of the at least one retaining tooth and preferably at each end thereof. Such a web is similar to flash resulting from accidental break in fluidtightness of the mold during casting but is systematically and controllably sought here to form means for restraining the duct mounting fixture against inadvertent sliding movement of the support section.

The hold of the mounting fixture on the support section is thus enhanced, any likelihood of free sliding action of the mounting fixture is thus prevented while permitting voluntary forced sliding movement if desired.

According to another improvement of the present duct mounting fixture, the head of the latch member defined by the fastening member has two transverse lobes in alignment with each other. On the underside of each of the lobes is provided a thin web which connects such a lobe to the shank and extends substantially as a triangle along the mean diametral plane of the corresponding lobe. The thickness of such a web is in practice substantially greater than that of the abovementioned web or webs and is nonetheless deformable like the former. Such a web suffices in a very simple way to adapt the duct mounting fixture to ducts having different endwall thicknesses by compensating for the different thicknesses by deformation.

The head of the latching member may then be compact, without having a slit for making a part thereof resiliently deformable for adapting the fixture to ducts having different endwall thicknesses.

On the contrary such a compact head which is advantageously highly rigid ensures good holding or securement of the duct, even when the duct is of relatively large size and/or carries a relatively heavy load.

For the same reason, in order to further enhance the rigidity of the head of the latch member defined by the fastening member of the present invention, the diametral slot which the head usually has for rotating it (e.g., with a screwdriver) preferably is closed ended, that is, its ends do not open onto the periphery of the head.

Finally, according to still another feature according to the present invention, the shank of the latch member has in cross section two (at least local) flats generally in diametrally opposite positions relative to each other and substantially perpendicular to the mean diametral plane of the lobes of the head.

The distance between the flats is substantially equal to the width of the openings in the endwall of the duct utilized for engagement of the duct on the head. The latch member of the duct mounting fixture is advantageously locked against rotation of the duct after insertion and rotation through 90°. The flats then come into bearing contact with edge of the opening through which the latch member is inserted after overcoming rotational resistance.

BRIEF DESCRIPTION OF THE DRAWINGS

These and other features and advantages of the present invention will become apparent from the description which follows, given by way of example, with reference to the accompanying schematic drawings.

FIG. 1 is a perspective view of a duct mounting fixture according to the invention, the latch member being shown in its fully inserted operative position;

FIGS. 2 and 3 are cross-sectional view of the duct mounting fixture taken along lines II—II and III—III, respectively, in FIG. 1;

FIGS. 4 and 5 are fragmentary cross-sectional views taken along lines IV—IV and V—V respectively in FIG. 1; and FIG. 6 is a bottom plane view taken in the direction of arrow VI in FIG. 3.

DESCRIPTION OF THE PREFERRED EMBODIMENT

Figure 7:
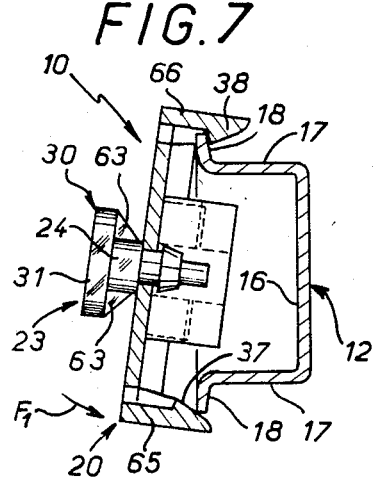
FIGS. 7 and 8 are different scale sectional views of the duct mounting fixture illustrating the installation on an omega-shaped support section.

A duct mounting fixture of the kind disclosed in the above-mentioned copending application Ser. No. 565,764 is shown in the drawings. This copending application is hereby incorporated by reference. Only those parts of the novel duct mounting fixture necessary for the understanding of the improvements and arrangements of the present invention will be described in particular detail. Moreover, the same parts will be indicated by the same references as in the above identified copending application.

Generally speaking the present duct mounting fixture 10 comprises a base plate 20 of generally rectangular configuration with rounded corners. The outer side of surface 21 of the base plate 20 defines a bearing plane against which the outer side of the endwall of duct 11 is adapted to bear. In the middle zone of the outer side 21 of the base plate 20 are means for receiving and cooperating with a fastening member which is adapted to extend through the endwall of the duct via an opening therein and grip the endwall of the duct. In the copending application Ser. No. 565,764 the means for receiving the fastening member comprise a well or bush which is reduced to a mere aperture 22' of circular contour in the base plate 20 here. Alternatively, the means for cooperating with the fastening member may comprise a well or bush with a lip thereof protruding from the outer side 21 of the base plate 20.

The fastening member 23 comprises a latch member rotatable 90° having a shank 24 rotatably mounted in the aperture 22' in the base plate 20. The latch member has two facing, transverse shoulders 25 axially spaced a distance d from each other for axially maintaining the latch member for rotation on the base plate 20. The head 30 of the latch member 30 has two transverse lobes 31 in alignment or continuation with each other on opposite sides of the axis of the shank 24 of the latch member.

In the illustrated embodiment the distance d between shoulders 25 on shank 24 of the latch member is substantially unaffected by the thickness of the base plate 20 within the limits of tolerances while being slightly greater than the thickness of the base plate 20. The base plate 20 itself defines inner and outer shoulders 26 adapted to cooperate with shoulders 25 for retaining the latch member on the base plate.

On the outer side of the plate member 20 the shank 24 of the latch member has, at least locally, diametrally opposite flats 60 (see FIG. 5) extending substantially perpendicularly to the mean diametral plane P of the lobes 31 of the head 30 of the latch member, i.e., a plane extending through axis A' of the shank 24 and along the center line or major axis of the lobes 31. The plane P and axis A' are schematically represented in FIG. 5 by a dotted line and a cross respectively.

In practice, as noted above, the distance d3 between flats 60 is selected to be substantially equal to the width or small dimension of the openings usually provided in the endwall of the duct.

Also in practice and as shown in the illustrated embodiment the shank 24 of the latch member has, at least locally, two diametrally opposite transverse flats 61 at right angles to flats 60 and therefore substantially parallel to the diametral plane P defined above. Distance d4 between flats 61 is made slightly less than distance d3 between flats 60.

Thus in the illustrated embodiment the cross section of the shank 24 of the latch member is generally oval.

As in the above-mentioned application Ser. No. 565,764 the head 30 of the latch member likewise has an oval cross section which is tangent to flats 61 of shank 24, the oval cross section being substantially complementary to that of the openings in the endwall of the duct.

According to the present invention on the underside of each lobe 31 of the head of the latch member is a thin deformable web or gusset 63 (preferably of flash-like thickness) running from the associated lobe 31 to the shank 24. In practice such a web is substantially triangular and lies along the mean diametral plane P of the associated lobe 31 and joins the shank 24 in the middle of the corresponding flat 60.

As in the copending Ser. No. 565,764 the head 30 of the latch member has a diametrally extending slot 36 on its outer surface for turning the latch member. But as shown in the present application the slot 36 has closed longitudinal ends, in other words, the ends to not open onto the periphery of the head 30 of the latch member. In practice, as shown, the slot 36 lies along the mean diametral plane P, stopping short of the ends of the lobes 31 or the corresponding edge of the head 30. In the illustrated embodiment, and for the sake of casting, the slot 36 is interrupted by a generally cylindrical hollow 64 in the middle of the slot 36 substantially along the axis A' in order to minimize the thickness in the middle of the head 30 and thereby preventing a contraction or shrink hole during cooling after casting.

In view of the foregoing, and despite slot 36, the head 30 of the latch member 30 is particularly solid. It has good rigidity and mechanical strength for holding the duct.

Nonetheless, owing to the deformability of the thin webs 63 they adapt to ducts having different endwall thicknesses within the limit, of course, of the distance d5 between the outer side 21 of the base plate 20 and the underside of the lobes 31 of the head 30.

Of course, although in the drawings the latch member defined by the fastening member 23 is shown in its operative, driven-in position, the portion of its shank 24 between the shoulders 25 are in engagement with the zone defining the aperture 22' in the base plate 20. The latch member may as disclosed in copending application Ser. No. 565,764 be of one piece molded construction with the base plate 20, joined to the base plate 20 by continuous or discrete frangible connecting means severed or ruptured when the latch member is driven to its operative position.

As described in the copending Ser. No. 565,764 the duct mounting fixture 10 further comprises at least two retaining teeth 37, 38 which are disposed on the underside of the base plate 20 for cooperation with the right angle flanges on the same support section, namely an omega-shaped or hat-shaped support section, and at least one of the retaining teeth 37, 38 is carried by a resilient arm. In practice, as shown, each retaining arm 37, 38 is carried by a resilient arm 65, 66.

The resilient arms 65, 66 are arranged along the opposite sides of the base plate 20 and separated from corner flanges 68 by notches 67, the corner flanges 68 stiffen the base plate and define along the edge of the corner flanges 68 coplanar bearing surfaces 49, 50 associated with the respective retaining teeth 37, 38.

It follows from the foregoing that the retaining teeth 37, 38 which face each other are disposed on opposite sides of the latch member and substantially symmetrically with respect to axis A' of the latch member shank 24 and at right angles to the X-axis of the base plate 20, as shown in dotted line in FIG. 1 and 6.

As in the copending Ser. No. 565,764 each of the resilient arms 65, 66 is accessible from outside the base plate 20. Along its two corresponding opposite sides the base plate 20 has two elongate rectangular slotlike cutouts 71,72 in line with the respective retaining teeth 37,38.

According to a feature of the present invention at least one of the retaining teeth 37, 38 is provided transversely with a thin deformable web 74 which is adapted to act as restraining means against sliding movement in contact with the corresponding flanges of an omega-shaped support section. In the illustrated embodiment the webs 74 are formed during casting of the duct mounting fixture 10 and extend from the free ends of each of the retaining teeth 37,38 continuously between the free ends and the underside of the base plate 20.

As described in copending Ser. No. 565,764 two pairs of retaining teeth are provided for two different types of support sections. The second pair of retaining teeth 37', 38' is adapted to a G-shaped support section.

In practice, as illustrated, the pairs of retaining teeth 37, 38 and 37', 38' are orthogonal to one another. Retaining teeth 37', 38' like retaining teeth 37', 38' are disposed on opposite sides of the latch member substantially symmetrically with respect to the axis A' of the shank 24 of the latch member. The retaining teeth 37', 38' extend laterally with respect to a Y-axis of the base plate 20, substantially perpendicular to the X-axis defined above. The Y-axis is also schematically represented by a dotted line in FIGS. 1 and 6.

It follows from the foregoing that the retaining teeth 37, 38 and 37', 38' extend parallel to opposite side edges of the base plate 20 and in practice set back with respect to the lateral edges of the base plate. In the illustrated embodiment the retaining teeth 37, 38 extend along the shorter side edges of the base plate 20 and retaining teeth 37', 38' along the longer side edges of the base plate.

Retaining tooth 37' which is level with retaining teeth 37,38 is carried by a resilient arm 76 accessible from outside through slotlike cutout 77 in base plate 20. In practice cutout 77 extends along the entire height of the resilient arm 76 and therefore divides the retaining tooth 37' into two portions 37'a and 37'b.

As above, retaining tooth 37' is provided locally with a thin deformable transverse web 74. In practice the web 74 is provided at each end of the retaining tooth 37' and in one piece molded construction therewith and web 74 joins the retaining tooth 37' to the underside of the base plate 20.

In conjunction therewith the retaining tooth 38' is carried by a rigid or semirigid wall or partition 45' which is in one piece with the base plate 20 on the underside thereof and set back with respect to the corresponding edge of the base plate.

Two ribs 78 laterally along wall 45' and in continuity with the corresponding corner flanges 68 of the base plate 20 continuously join the base plate, the corner flanges 68 and wall 45' to a ledge 52 protruding from the wall 45' parallel to the retaining tooth 38' and spaced therefrom for forming a bearing surface 50' associated with the retaining tooth 38'. In practice ledge 52 extends in line with the corresponding edge of the base plate 20 and the bearing surface 50' thereon protrudes obliquely to its free edge beyond the retaining tooth 38' for facilitating the engagement of the duct mounting fixture on a G-shaped support section.

The engagement of the duct mounting fixture 10 disclosed herein is similar to that of the duct mounting fixture of the copending Ser. No. 565,764.

Figure 8:
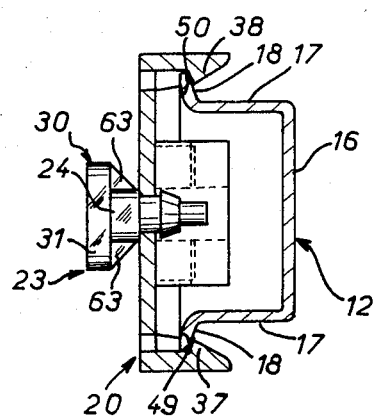

With reference to FIGS. 7 and 8 the mounting fixture 10 is intended to be fitted on an omega-shaped support section 12. First of all, one of the retaining teeth 38 engages a right angle flange 18 of the support section 12 by introducing the mounting fixture 10 in the direction of arrow F1 at an angle (FIG. 7), then the mounting fixture is swung in place about that right angle flange 18. During the swinging movement, there is a temporary resilient deformation of resilient arm 65 carrying retaining tooth 37 until the retaining tooth comes into alignment with the inner surface of the right angle flange 18 of the support section 12. The retaining tooth 37 is thus engaged under the flange 18 thereby enabling the resilient return of the resilient arm 65 to its initial position, FIG. 8. The duct mounting fixture 10 is thus installed by detenting or resiliently clamping on the support section 12. Thereupon the duct mounting fixture 10 is firmly secured to the support section 12. The thin deformable webs 74 are deformed by the free edges of the right angle flanges 18 to prevent longitudinal sliding movement of the mounting fixture therealong.

Figure 9:
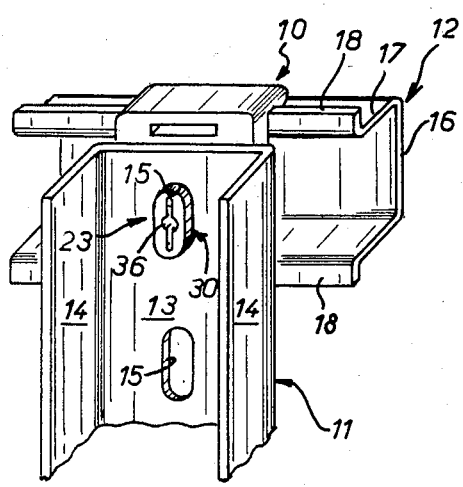
FIGS. 9 and 10 are perspective views illustrating the installation of a duct on a mounting fixture.
Figure 10:
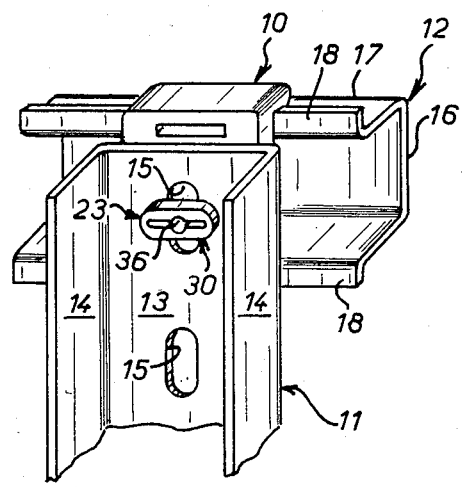

It will now be assumed that the duct 11 to be secured on the omega-shaped support section 12 is to be oriented at right angles thereto. The lobes 31 of the head 30 of the latch member are then disposed at right angles to the support section, FIG. 9, and the head 30 duct 11. Thereupon, simply by means of a screwdriver, the latch member is turned 90°, FIG. 10, so that the webs 63 on the head 30 are deformed by the opening in the endwall 13 of duct 11, the latter is then firmly secured to the mounting fixture 10 and thereby to the support section itself.

When the opening 15 in the endwall 13 of the duct 11 is slid over the head 30 of the latch member the flats 61 are juxtaposed to the longitudinal edges of the opening 15. During rotation of the latch member through 90° the resistance offered by the thicker curved zones of the shank 24 between adjacent flats 60 and 61 is overcome and the flats 60 spaced a distance d4 equal to the distance between the longitudinal edges of the opening 15 come into engagement with the longitudinal edges to define a stable, predetermined duct latching position for the latch member. The deformation of the triangular webs 63 produced as the latch member is turned to its duct latching position grips the duct and adapts the distance between the head and the bearing plane is the thickness of the endwall of the duct. The duct may be easily removed by turning the latch member 90° and then disengaging the duct.

Figure 11:
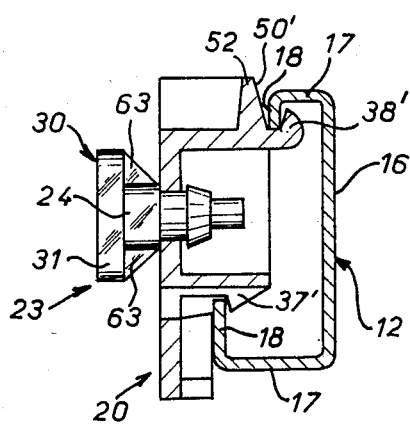
FIG. 11 is a view similar to that of FIG. 8 for a G-shaped support section.

When, as illustrated in FIG. 11, the mounting fixture according to the invention is to be secured on a G-shaped support section 17, one proceeds as above but retaining teeth 37', 38' of the mounting fixture are then in a particular direction. A marking may be provided on the mounting fixture for this purpose.

With a G-shaped support section 12 the retaining tooth 38' is first hooked under one of the right angle flanges 18 and then the resilient arm 76 carrying retaining tooth 37' cams against the free edge of the other right angle flange 18 resiliently deflecting the resilient arm until the retaining tooth 37' clears and then grips the other right angle flange. On resilient clipping the deformable ribs 74 are deformed so as to prevent relative longitudinal sliding movement of the mounting fixture 10 on the G-shaped support section 12.

Also, securement is carried out in two steps: a first step which involves the resilient clamping or detenting action of the duct mounting fixture on the support section 12 which is very easy and a second locking step of the duct 11 on the duct mounting fixture 10 which is also very easy. Advantageously with the present duct mounting fixture it is not necessary to simultaneously deal with the securement of the duct mounting fixture on the support section and the mounting of the duct on the mounting fixture. Overall, duct mounting and securement is therefore facilitated.

The present invention is not intended to be limited to the illustrated and described embodiments but encompasses all variations and alternatives understood to those skilled in the art without departing from the scope of the appended claims.

In particular, although it is preferred fastening member 23 is not necessarily initially contiguous with the base plate. Alternatively the fastening member may be a self-threading or -tapping fastener to be screwed into the base plate, the thread of such a fastener biting into the inner wall of the well or bush in the base plate.

Likewise the fastening member when initially contiguous with and joined to the base plate from the outset is not necessarily a rotatable latch member. It may be a detenting member.

What is claimed is:

1. A duct mounting fixture for securing a duct selected generally channel-shaped support sections having right angle flanges at distal ends of legs or sidewalls, said duct mounting fixture comprising a base plate having an outer surface defining a bearing surface for an endwall of a duct, means for receiving a fastening member in a middle zone of the outer surface of the base plate, said fastening member in a middle zone of the outer surface of the base plate, said fastening member being adapted to extend through an opening in the endwall of the duct and grip the endwall, two pairs of retaining teeth being disposed on the underside of said base plate and each of said pairs of retaining teeth being selectively cooperable with right angle flanges of a different support section, each of said retaining teeth being carried by a separate arm, one of said arms for each of said pairs of retaining teeth being resiliently deformable, one of said pairs of retaining teeth extending in a first direction and the other of said pairs of retaining teeth extending in a second direction at an angle to said first direction.

2. The duct mounting fixture of claim 1, wherein each of said arms is resiliently deformable.

3. The duct mounting fixture of claim 1, wherein said retaining teeth of one of said pairs of retaining teeth are directed toward each other and said retaining teeth of the other of said pairs of retaining teeth are directed away from each other.

4. The duct mounting fixture of claim 1, wherein said fastening member comprises a shank for rotatably mounting said fastening member in a well or bush in a middle zone of base plate, said fastening member also having a head at the outer end of said shank, said head having at least one lobe extending radially outwardly with respect to the axis of said shank, said head having a slot for turning said fastening member from a duct engagement position to a latching position, said slot being closed ended.

5. The duct mounting fixture of claim 1, wherein a well or bush for receiving a fastening member is provided in the middle zone of said outer side or surface of said base plate, said fastening member including a shank for rotatably mounting said fastening member in said well or bush and a head having two diametrically aligned lobes extending radially outwardly relative to the axis of said shank, said shank having flats at substantially diametrically opposite positions and arranged substantially perpendicular to the mean diametral plane of said lobes.

6. The duct mounting fixture according to claim 1, said means for receiving the fastening member comprising a cylindrical aperture, said aperture being of substantially constant cross section and of a length equal to the thickness of a surrounding portion of said base plate, said fastening member having a shank rotatably mounted in said cylindrical aperture in said base plate.

7. The duct mounting fixture of claim 1, wherein said first pair of retaining teeth being disposed on respective sides of said means for receiving said fastening member, said second pair of retaining teeth being disposed on respective sides of said means for receiving said fastening member, said first and second directions being substantially perpendicular to each other.

8. The duct mounting fixture of claim 7, wherein said two pairs of retaining teeth are in a generally rectangular array.

9. A duct mounting fixture according to claim 1, wherein at least one of said retaining teeth has a transversely extending thin, deformable web, said web being cooperable with the corresponding right angle flange of the support section and defining means for restraining said duct mounting fixture against inadvertent sliding movement on the support section.

10. The duct mounting fixture of claim 9, wherein said web is disposed at one end of the associated at least one retaining tooth.

11. The duct mounting fixture of claim 9, wherein said duct mounting fixture is of molded plastic construction and the thickness of said web being of the order of thickness of flash.

12. A duct mounting fixture according to claim 1, wherein said fastening member includes a latch member having a shank for rotatably mounting said latch member in said aperture, said latch member including a head having at least one lobe extending radially outwardly with respect to the axis of the shank, a thin, deformable gusset joining said lobe to said shank, said gusset being cooperable with the duct to adapt to the thickness of the endwall of the duct by deformation.

13. The duct mounting fixture of claim 12, wherein said duct mounting fixture is of molded plastic construction.

14. The duct mounting fixture of claim 12, wherein said head comprises two said lobes in diametral alignment with each other and extending radially in opposite directions relative to the axis of said shank.

15. The duct mounting fixture of claim 14, wherein said gussets are substantially triangular and lie along a mean diametral plane of said head.

* * * * *